March 15, 1938.  C. PULEJO ET AL  2,110,963
BURNER FOR LIQUID FUEL
Filed March 21, 1935  3 Sheets-Sheet 1
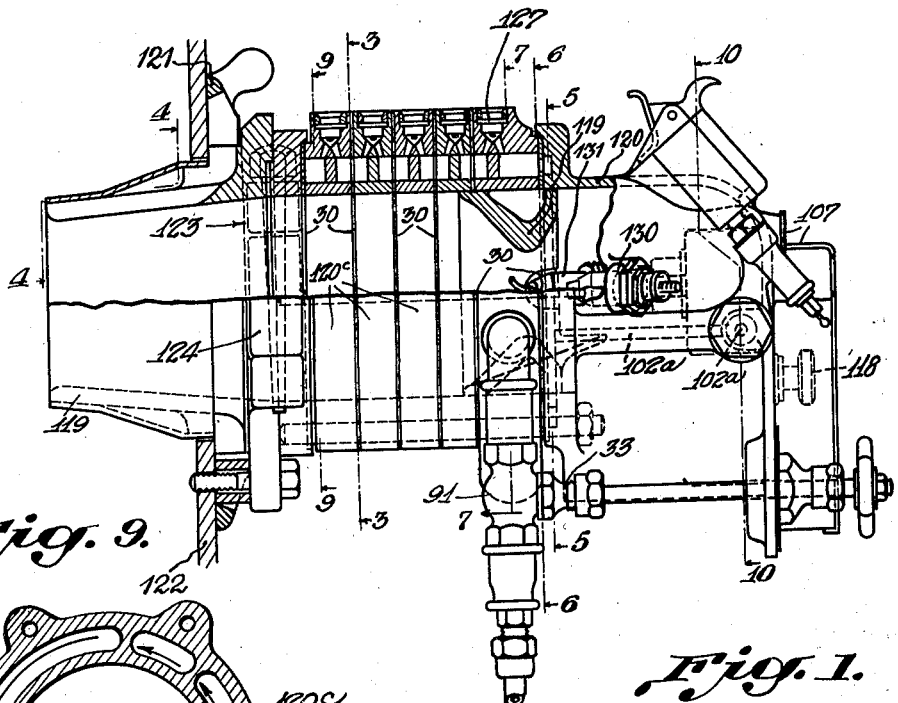
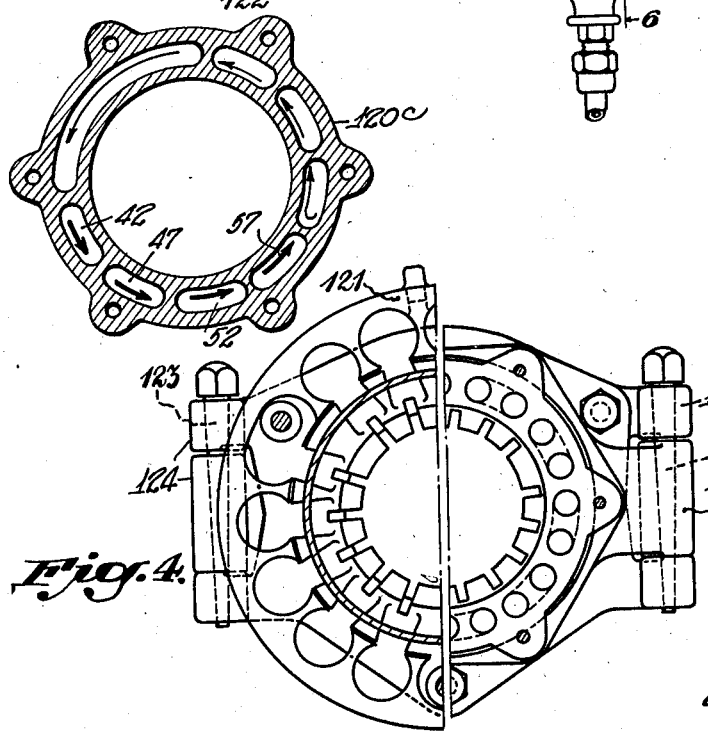
Inventors:
Carlo Pulejo
and Jean Staub

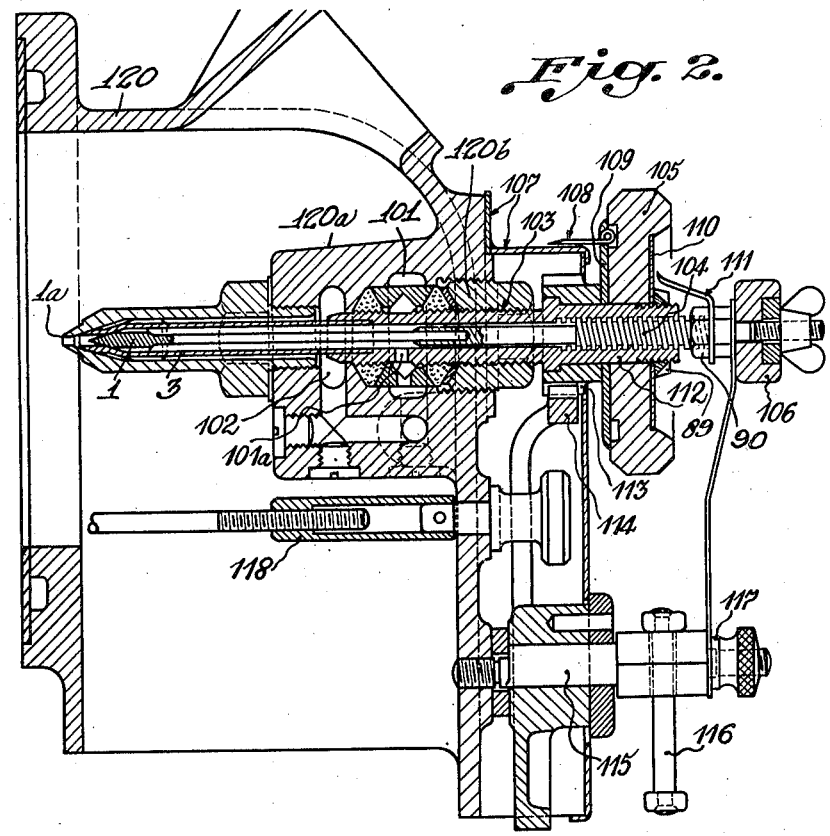
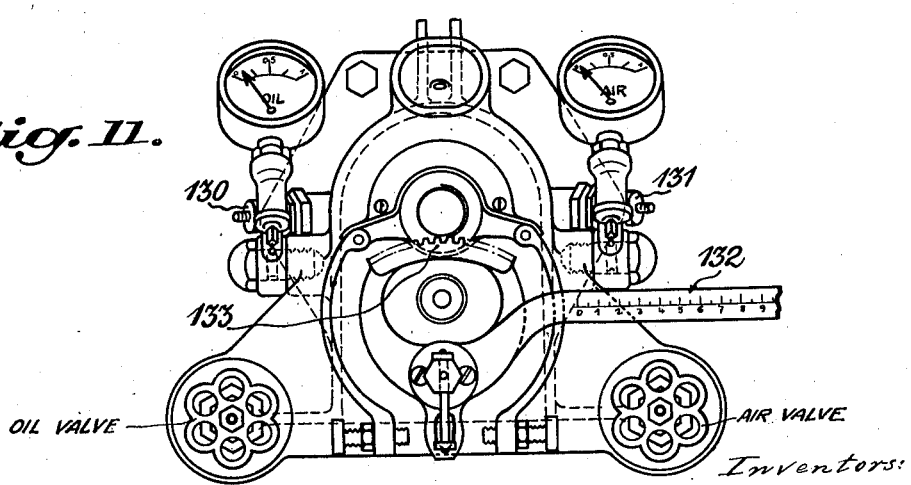

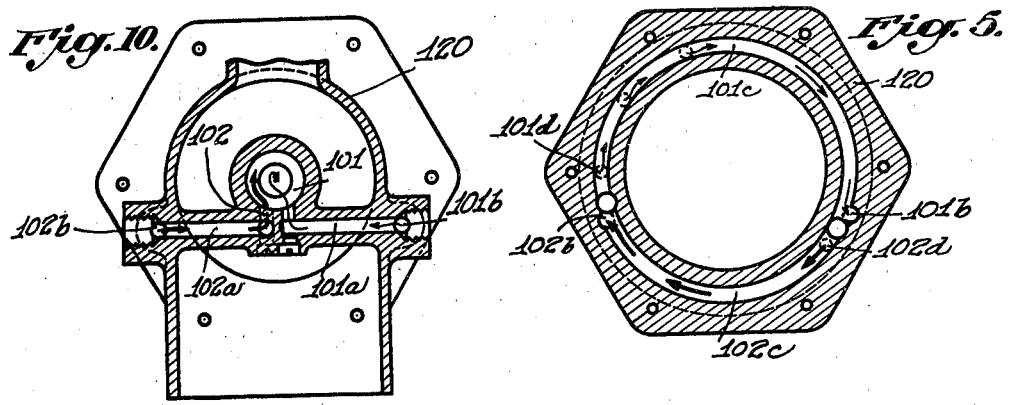
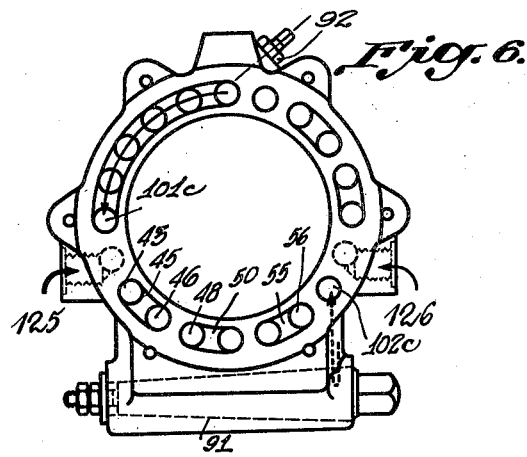
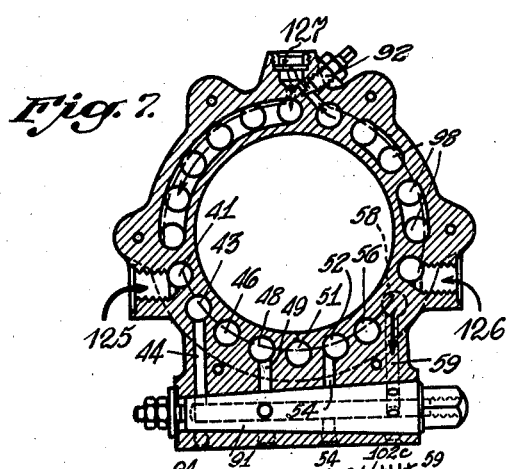

Patented Mar. 15, 1938

2,110,963

UNITED STATES PATENT OFFICE 2,110,963

BURNER FOR LIQUID FUEL

Carlo Pulejo and Jean Staub, Lausanne, Switzerland

Application March 21, 1935, Serial No. 12,296
In Switzerland March 28, 1934

1 Claim. (Cl. 158—36)

The present invention relates to a burner device of the nozzle type for mazout and other liquid fuels.

An object of this invention is to provide a burner for liquid fuel having a combustion chamber provided with a burner nozzle operative therein, means for supplying regulated amounts of fuel and spraying medium, and means for preheating the fuel and spraying medium.

The annexed drawings show diagrammatically and by way of example several forms of construction of the invention.

Figure 1 is an elevational view partly in section of an apparatus embodying the present invention.

Fig. 2 is a vertical sectional view of the burner.

Fig. 3 is a fragmentary sectional view taken on line 3—3 of Fig. 1.

Fig. 4 is a fragmentary sectional view taken on line 4—4 of Fig. 1.

Fig. 5 is a fragmentary sectional view taken on line 5—5 of Fig. 1.

Fig. 6 is a fragmentary sectional view taken on line 6—6 of Fig. 1.

Fig. 7 is a fragmentary sectional view taken on line 7—7 of Fig. 1.

Figs. 8a, 8b, 8c and 8d are sections of the valve plug taken on planes passing through the ports thereof.

Fig. 9 is a fragmentary sectional view taken on line 9—9 of Fig. 1.

Fig. 10 is a fragmentary sectional view taken on line 10—10 of Fig. 1.

Fig. 11 is a fragmentary view of the regulating mechanism for the burner.

As shown in the drawings, the present invention comprises an assembly including a burner nozzle, a fuel preheater and an injector, which assembly is mounted in an opening in the wall 122 of a furnace. The burner proper (Fig. 2) comprises a housing 120 having a boss 120a in which is mounted the burner nozzle 1a. This nozzle communicates with a chamber 102 to which liquid fuel is supplied through a duct 102a (Fig. 10) fed by a duct 102b which communicates by duct 102c with a port 102d (Figs. 5 and 6). A tubular valve body 3 cooperates with nozzle 1a to control the flow of liquid fuel from chamber 102 through nozzle 1a.

Air or other atomizing medium is supplied to chamber 101 in boss 120a by duct 101a which communicates through ducts 101b and 101c (Figs. 5 and 10) with port 101d (Fig. 6). From chamber 101 air flows through port 101a into the tubular valve 3 and out through its tapered end.

A needle valve 1 cooperates with the tubular member 3 to control the flow of the air.

The tubular valve body 3 is carried by a tubular sleeve 112 having external threads 103 engaging the internal threads of a bushing 120b supported in boss 120a. A hand wheel 105 is fixed to sleeve 3a and serves to regulate the position of valve 3.

Sleeve 112 is internally threaded to receive the threaded portion 104 of needle valve 1. A hand wheel 106 serves to adjust the position of valve 1.

Threads 103 and 104 are of opposite pitch so that by rotating wheel 105 while holding wheel 106 stationary, the flow of liquid may be increased, whereas the flow of air will be decreased, and vice versa.

The fuel regulation is indicated by a dial 107 on the casing and a hinged index-hand 108 on the hand-wheel 105, which index hand can be set to zero by rotating a disc 109 relatively to the hand-wheel. A dial 110 for indicating the atomized liquid fuel is integral with the hand-wheel 105 and cooperates with an index hand 111 which can be set to zero by turning it relatively to the hand-wheel 106.

These indicators can be set when the locking nuts 89 and 90 are loosened.

When the nuts 89 and 90 are tightened the two hands move with their knobs. The sleeve 112 engaging the screw 104 is held stationary by means of teeth 113 on said sleeve which are in mesh with the teeth of a segment 114 mounted on a spindle 115 which is eccentric for the purpose of releasing the segment 114 from the teeth 113 when it is desired to clean the burner or to change the needle valves. The rotation of this spindle 115 is effected easily by a lever 116 upon loosening a lock nut 117.

A diffuser 119 is arranged co-axially with the needle valve assembly and can be given a movement of translation by means of a screw and nut device 118 (Fig. 1) actuated by an external hand-wheel. Ignition is obtained by means of spark plugs 130 and 131.

A lever 132 indicated in Fig. 11 is arranged to rotate the segment 114, thereby actuating the needle valves 1, 3 automatically and differentially, which lever is moved by a thermostat (not shown) in well-known manner.

Fig. 1 shows the connection to the burner casing 120 of a row of annular preheating elements 120c with the inter-position of gaskets 30 of copper, for example.

The axial opening of these elements 120c forms a continuation of the space in the burner casing 120. Between the last element 120c and the wall 122 of the boiler associated with the burner is an injector with a disc valve 121 for regulating the admission of additional air, said disc having radial grooves the effect of which is to divide up the air into small quantities and to heat it by contact with the injector before said air comes into contact with the flame. The assembly of burner, preheater and injector is removably attached to the boiler, as is clearly indicated in Figs. 3 and 4, by means of tapered rods 123 engaging bores in lugs 124, this arrangement constituting a hinged fitting.

The preheater element adjacent the housing 120 has an inlet 125 (Figs. 1, 6 and 7) for the liquid fuel, an inlet 126 for the atomizing medium, and internal circulation conduits for these media. The arrows in heavy lines indicate circulation in the elements for the fuel to be superheated and the arrows in thin lines indicate the circulation of air or vaporized oil for atomization. In the base of the preheater is a cock, the plug 91 of which has a bore 93 and sets of ports 94, 95, 96 and 97 for the purpose of varying the effect of the preheater elements 120c.

Liquid fuel, such as oil, is fed through conduit 32 provided with control valve 33 through inlet 125 of the first preheater section into channel 41. The oil flows through channel 41 to return member 42 formed in the element 120c at the other end of the preheater and back through channel 43. With valve plug 91 in the position shown in Figs. 7, 8a, 8b, 8c and 8d, the oil will flow then through duct 44 and port 94 into bore 93 and out through port 97 into duct 102c which communicates with chamber 102.

If valve 91 were rotated 90° clockwise from the position shown in Fig. 8b, then the oil would flow from channel 43 into return chamber 45 (Fig. 6) through channel 46 to return chamber 47 (Fig. 9) and back through channel 48. From channel 48, the oil would then flow through duct 49, through port 95 into bore 93 and out through port 97 to duct 102c.

Obviously, if the plug 91 were rotated 180°, the oil would have to flow also through return 50 (Fig. 6), channel 51, return 52 (Fig. 9), channel 53, duct 54, through port 96, bore 93 and port 97 to duct 102c.

With the plug 91 rotated 270° clockwise, the oil would flow additionally from return 55 (Fig. 6) through channel 56, return 57 (Fig. 9), channel 58, duct 59, one of ports 97, bore 93, and another of ports 97 to duct 102c.

The device may be constructed with provision for adding or taking away one or more of such elements according to need, the first and the last being alone indispensable in all cases.

The atomizing medium, which may be air or liquid fuel, is introduced into the preheater at 126 and is passed back and forth through the serially connected channels 98 and is discharged through duct 101c which communicates with chamber 101.

When the liquid fuel is to be vaporized and used as an atomizing medium, it is distributed to the preheater elements in the required quantity by needle regulation devices 92 placed in the upper parts of the elements (Fig. 7). An inspection hole 127 consisting of a disc of transparent material permits the checking of the flow of superheated oil for gasification.

Oil pumps, compressors and other usual machines can, of course, be utilized for the circulation of the two fluids.

We claim:—

A burner for liquid fuel, comprising an open-ended combustion chamber, a nozzle positioned to discharge a spray of liquid fuel into one end of said combustion chamber, means for supplying liquid fuel and a spraying medium to said nozzle, means for controlling the supplies of liquid fuel and spraying medium to said nozzle, and means for preheating the fuel and the spraying medium, said preheating means comprising a plurality of elements forming part of the wall of the combustion chamber, said elements each having separate circulation channels therein, and a multiple-way cock connected to the channels and having means for controlling the circulation through the channels in said elements whereby certain of the channels can be brought into and cut out of operation.

CARLO PULEJO.
JEAN STAUB.